(12) United States Patent
Han et al.

(10) Patent No.: US 9,632,216 B2
(45) Date of Patent: Apr. 25, 2017

(54) OPTICAL MODULATING DEVICE HAVING GATE STRUCTURE

(71) Applicants: SAMSUNG ELECTRONICS CO., LTD., Suwon-si (KR); CALIFORNIA INSTITUTE OF TECHNOLOGY, Pasadena, CA (US)

(72) Inventors: Seunghoon Han, Seoul (KR); Yao-Wei Huang, Pasadena, CA (US); Harry A. Atwater, Pasadena, CA (US); Ho Wai Lee, Pasadena, CA (US); Ruzan Sohkoyan, Pasadena, CA (US); Georgia Papadakis, Pasadena, CA (US); Krishnan Thyagarajan, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/010,967

(22) Filed: Jan. 29, 2016

(65) Prior Publication Data

US 2016/0223723 A1    Aug. 4, 2016

Related U.S. Application Data

(60) Provisional application No. 62/111,583, filed on Feb. 3, 2015.

(30) Foreign Application Priority Data

Jul. 29, 2015 (KR) .................. 10-2015-0107515

(51) Int. Cl.
*G02F 1/01* (2006.01)
*G02F 1/03* (2006.01)
(Continued)

(52) U.S. Cl.
CPC ............. *G02B 5/008* (2013.01); *G02F 1/01* (2013.01); *G02F 1/19* (2013.01); *G02F 1/292* (2013.01);
(Continued)

(58) Field of Classification Search
CPC ...... G02B 5/008; G02B 5/1809; G02B 5/281; G02B 5/288; G02F 1/0018; G02F 1/0081;
(Continued)

(56) References Cited

U.S. PATENT DOCUMENTS 7,787,735 B2 *  8/2010  Fujiwara ............... B82Y 20/00
                                                        385/131
8,698,096 B2 *  4/2014  Chen ....................... B01J 19/12
                                                        250/208.2

(Continued)

FOREIGN PATENT DOCUMENTS

WO     2014/126789 A1    8/2014

OTHER PUBLICATIONS

Walther et al.; "Spatial and Spectral Light Shaping with Metamaterials"; Advanced Materials; vol. 24; 2012; http://libra.kaist.ac.kr/2cc385d/_Lib_Proxy_Url/onlinelibrary.wiley.com/doi/10.1002/adma.201202540/epdf; 5 pages total.
(Continued)

*Primary Examiner* — Loha Ben
(74) *Attorney, Agent, or Firm* — Sughrue Mion, PLLC

(57) ABSTRACT

An optical modulation device includes a plasmonic nano-antenna layer, a metal layer that faces the plasmonic nano-antenna layer, and a permittivity variation layer and a dielectric material layer between the plasmonic nano-antenna layer and the metal layer. An active area formed in the permittivity variation layer according to an external signal may function as a gate that controls optical modulation performance.

22 Claims, 12 Drawing Sheets

(51) Int. Cl.
*G02B 5/08* (2006.01)
*G02B 5/00* (2006.01)
*G02F 1/19* (2006.01)
*G02F 1/29* (2006.01)
*G02F 1/00* (2006.01)

(52) U.S. Cl.
CPC ........ *G02F 1/0018* (2013.01); *G02F 2203/10* (2013.01); *G02F 2203/11* (2013.01); *G02F 2203/50* (2013.01)

(58) Field of Classification Search
CPC ... G02F 1/01; G02F 1/19; G02F 1/292; G02F 2203/10; G02F 2203/11; G02F 2203/24; G02F 2203/50
USPC ....... 359/237, 241, 244, 245, 279, 298, 300, 359/315, 316, 318, 359, 360; 438/71, 73; 977/834
See application file for complete search history.

(56) References Cited

U.S. PATENT DOCUMENTS

| | | | |
|---|---|---|---|
| 8,711,463 B2* | 4/2014 | Han | B82Y 20/00 359/238 |
| 9,256,113 B2 | 2/2016 | Han et al. | |
| 9,261,714 B2* | 2/2016 | Kim | G02F 1/0126 |
| 9,285,611 B2* | 3/2016 | Han | B82Y 20/00 |
| 2004/0008397 A1 | 1/2004 | Noonan | |
| 2011/0103742 A1 | 5/2011 | Obara et al. | |
| 2012/0212375 A1* | 8/2012 | Depree, IV | H01Q 15/0086 343/700 MS |
| 2013/0215483 A1 | 8/2013 | Han et al. | |
| 2013/0258293 A1 | 10/2013 | Peng et al. | |
| 2014/0085693 A1 | 3/2014 | Mosallaei et al. | |
| 2014/0158198 A1 | 6/2014 | Simovski | |
| 2014/0175546 A1* | 6/2014 | Huffaker | H01L 31/022425 257/342 |
| 2014/0185122 A1 | 7/2014 | Han et al. | |
| 2014/0226195 A1* | 8/2014 | Elsayad | G01N 21/6458 359/241 |
| 2016/0146989 A1* | 5/2016 | Sakat | G02B 5/008 250/349 |
| 2016/0170237 A1* | 6/2016 | Han | B82Y 20/00 359/241 |

OTHER PUBLICATIONS

Zhao et al.; "Tailoring the Dispersion of Plasmonic Nanorods to Realize Broadband Optical Meta-Waveplates"; Nano Letters; American Chemical Society; vol. 13; 2013; 6 pages total.

Yu et al.; "Light Propagation with Phase Discontinuities: Generalized Laws of Reflection and Refraction"; Research Articles; Science; vol. 334; Oct. 21, 2011; 29 pages total.

Yu et al.; "Flat optics with designer metasurfaces"; Nature Materials; www.nature.com/naturematerials; vol. 13; Feb. 2014; 12 pages total.

Sun et al.; "High-Efficiency Broadband Anomalous Reflection by Gradient Meta-Surfaces"; Nano Letters; American Chemical Society; vol. 12; 2012; 7 pages total.

Feigenbaum et al.; "Unity-Order Index Change in Transparent Conducting Oxides at Visible Frequencies"; Nano Letters; American Chemical Society; vol. 10; 2010; 6 pages total.

Lee et al.; "Nanoscale Conducting Oxide PlasMOStor"; Nano Letters; American Chemical Society; vol. 14; 2014; 6 pages total.

Xingjie Ni, et al., "Broadband Light Bending with Plasmonic Nanoantennas," Science, vol. 335, Jan. 27, 2012, p. 427.

Communication dated Jul. 18, 2016 issued by the International Searching Authority in counterpart Application No. PCT/US2016/016475 (PCT/ISA/210/220/237).

* cited by examiner

OPTICAL MODULATING DEVICE HAVING GATE STRUCTURE

CROSS-REFERENCE TO RELATED APPLICATION

This application claims the benefit of Korean Patent Application No. 10-2015-0107515, filed on Jul. 29, 2015, in the Korean Intellectual Property Office, and U.S. Provisional Application Ser. No. 62/111,583, filed on Feb. 3, 2015, in the United States Patent Trademark Office, the disclosures of which are incorporated herein in their entirety by reference.

BACKGROUND

1. Field

Apparatuses consistent with exemplary embodiments relate to optical devices that modulate light.

2. Description of the Related Art

Optical devices that change the transmittance, reflection, polarization, phase, intensity, path, etc. of incident light are utilized in various optical apparatuses. Optical modulators used in optical systems have various structures for controlling these properties in a desired way.

As an example, anisotropic liquid crystals and microelectromechanical system (MEMS) structures, utilizing micromechanical movements to block light or control reflection elements, as well as other elements, are widely used in typical optical modulators. However, operating response times of such optical modulators are slow and may reach more than several μs according to known methods of driving optical modulators.

It is desired to utilize nano antennae that utilize the surface plasma resonance phenomenon, which occurs at a boundary between a metal layer and a dielectric layer, in conjunction with optical modulators.

SUMMARY

One or more exemplary embodiments may provide an optical device that modulates light.

Additional exemplary aspects will be set forth in part in the description which follows and, in part, will be apparent from the description, or may be learned by practice of the presented exemplary embodiments.

According to an aspect of an exemplary embodiment, an optical modulation device includes a plasmonic nano-antenna layer; a metal layer that faces the plasmonic nano-antenna layer; a permittivity variation layer between the plasmonic nano-antenna layer and the metal layer, the permittivity variation layer having a permittivity that varies according to a signal applied thereto; and a dielectric material layer between the plasmonic nano-antenna layer and the metal layer.

The optical modulation device may further include: a signal applying means configured to apply a signal to the permittivity variation layer, thereby causing a change in the permittivity of the permittivity variation layer.

The signal applying means may be a power source configured to apply a voltage between the plasmonic nano-antenna layer and the metal layer.

The permittivity variation layer may include an electro-optic material having a permittivity that varies according to an electrical signal applied thereto.

The permittivity variation layer may include a transparent conductive material.

The permittivity variation layer may include a transition metal nitride.

The permittivity variation layer may include an active area having a carrier concentration that varies according to a voltage applied between the plasmonic nano-antenna layer and the metal layer.

The permittivity variation layer may include a heavily doped semiconductor.

The active area of the permittivity variation layer may be adjacent to the dielectric material layer.

A real part of a dielectric constant of the permittivity variation layer may be equal to 0 in a predetermined wavelength band.

The predetermined wavelength band may be different according to the carrier concentration in the active area.

The voltage applied by the power source between the plasmonic nano-antenna layer and the metal layer may be in a range including a voltage value at which a resonance wavelength band of the plasmonic nano-antenna layer and the predetermined wavelength band are identical.

The plasmonic nano-antenna layer may include a plurality of nano-antenna lines spaced apart from each other in a first direction, and each of the plurality of nano-antenna lines may include a plurality of nano-antennas connected to each other in a second direction different from the first direction.

Each of the plurality of nano-antennas may have a criss-cross shape in which a nano rod having a length in the first direction and a nano rod having a length in the second direction cross each other.

Each of the plurality of nano-antennas may be one of circular, oval, polygonal, X-shaped, and star-shaped.

The power source may be configured to independently apply a voltage between each of the plurality of nano-antenna lines and the metal layer.

Values of voltages applied between the metal layer and each of the plurality of nano-antenna lines may have a predetermined regularity in the first direction.

The permittivity variation layer may be provided on the metal layer and the dielectric material layer is provided on the permittivity variation layer.

The dielectric material layer may be provided on the metal layer and the permittivity variation layer is provided on the dielectric material layer.

The permittivity variation layer may be patterned in a same shape as the plasmonic nano-antenna layer.

The plasmonic nano-antenna layer may include a metal material and a nano pattern of a plurality of through holes formed in the metal material.

According to an aspect of an exemplary embodiment, an optical apparatus includes the optical modulation device.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
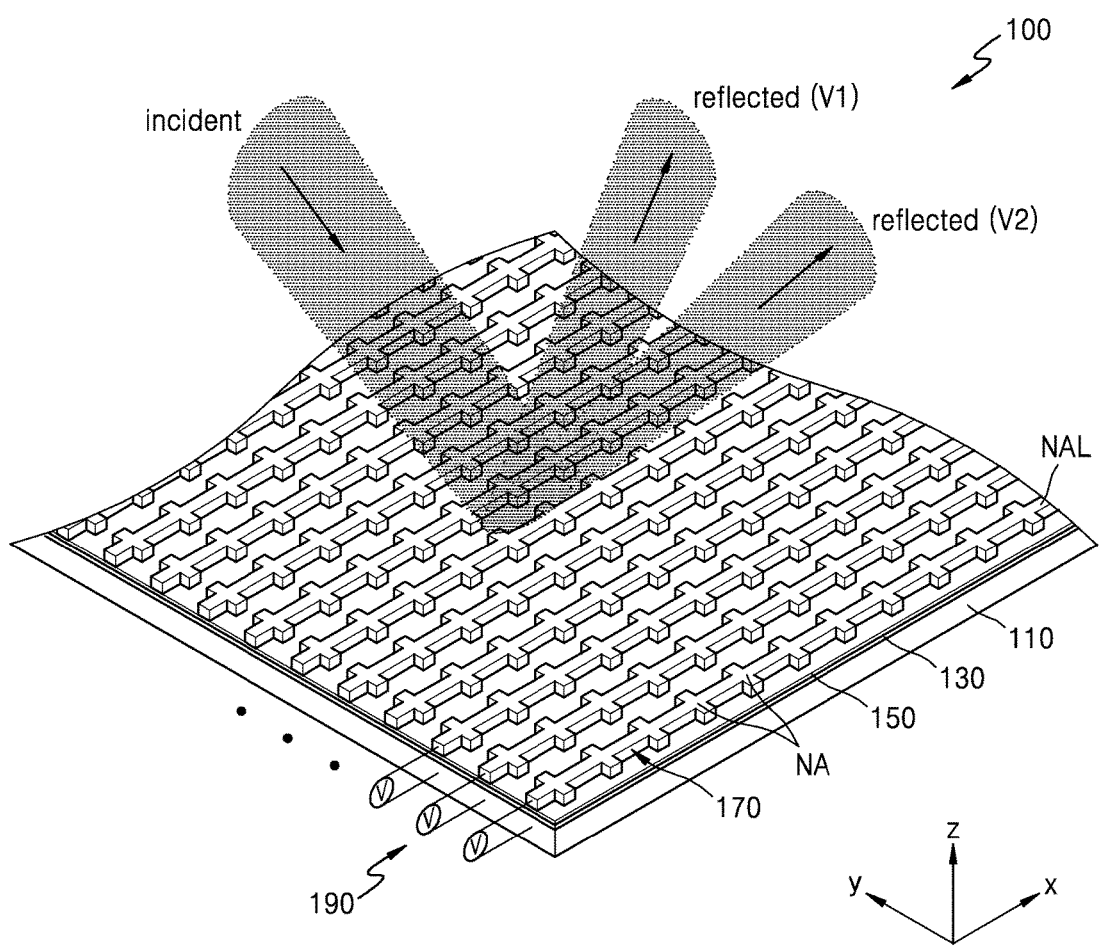
FIG. 1 is a schematic perspective view of a structure of an optical modulation device, according to an exemplary embodiment.

Exemplary embodiments will now be described more fully with reference to the accompanying drawings. Like reference numerals in the drawings denote like elements, and, in the drawings, the sizes of elements may be exaggerated for clarity and for convenience of explanation. In this regard, the exemplary embodiments may have different forms and should not be construed as being limited to the descriptions set forth herein. It will be understood that when a layer is referred to as being "on" another layer or substrate, it can be directly on the other layer or substrate, or intervening layers may also be present. Expressions such as "at least one of," when preceding a list of elements, modify the entire list of elements and do not modify the individual elements of the list.

Figure 2:
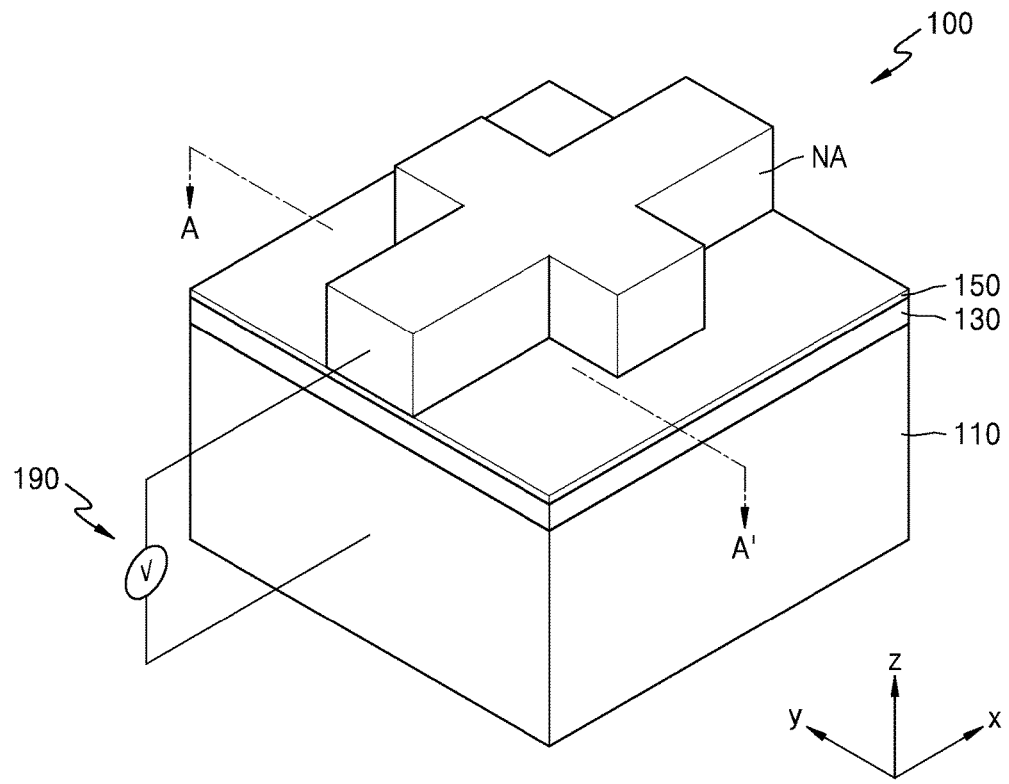
FIG. 2 is a detailed perspective view of a unit block of the optical modulation device of FIG. 1.
Figure 3:
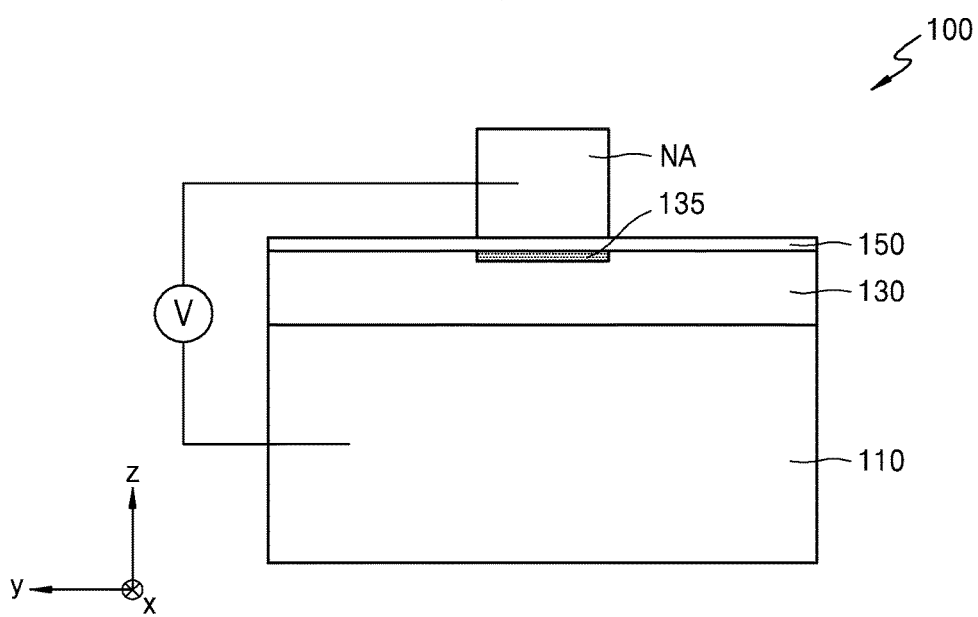
FIG. 3 is a cross-sectional view of a gate structure formed in a unit block of the optical modulation device of FIG. 1.

FIG. 1 is a schematic perspective view of a structure of an optical modulation device 100, according to an exemplary embodiment. FIG. 2 is a detailed perspective view of a unit block of the optical modulation device 100 of FIG. 1. FIG. 3 is a cross-sectional view of a gate structure formed in a unit block of the optical modulation device 100 of FIG. 1.

Referring to FIGS. 1 through 3, the optical modulation device 100 may include a plasmonic nano-antenna layer 170 and a metal layer 110 that faces the plasmonic nano-antenna layer 170. A permittivity variation layer 130 is disposed between the plasmonic nano-antenna layer 170 and the metal layer 110 and has a permittivity that varies according to an external signal. A dielectric material layer 150 is disposed between the plasmonic nano-antenna layer 170 and the metal layer 110.

To vary the permittivity of the permittivity variation layer 130, the optical modulation device 100 may further include a signal applying means that applies an external signal to the permittivity variation layer 130. The signal applying means may be, for example, a voltage source 190 that applies a voltage between the plasmonic nano-antenna layer 170 and the metal layer 110 in order to form an electric field in the permittivity variation layer 130 but the signal applying means is not limited thereto.

Although the permittivity variation layer 130 and the dielectric material layer 150 are sequentially provided on the metal layer 110 in FIGS. 1 through 3, the layout order of the permittivity variation layer 130 and the dielectric material layer 150 may be switched.

The plasmonic nano-antenna layer 170 may include a plurality of nano-antennas NA formed of conductive materials. The nano-antennas NA are artificial structures, each having shapes with dimensions of a sub-wavelength. The nano-antennas NA act to strongly collect light in a predetermined wavelength band. In this regard, the term "sub-wavelength" means a dimension smaller than an operating wavelength of the nano-antennas NA, i.e., the predetermined wavelength band. The dimensions of the shapes of the nano-antennas NA, which are sub-wavelength are for example, at least one of a thickness, a width, and a height of the nano-antennas NA, and a spacing between the nano-antennas NA.

A function of nano-antennas NA is performed by surface plasmon resonance that occurs at a boundary between a metal material and a permittivity material. A resonance wavelength varies according to a detailed shape of the nano-antennas NA.

As shown, the plasmonic nano-antenna layer 170 may include a plurality of nano-antenna lines NAL spaced apart from each other in a first direction, for example, a y direction, as shown in FIG. 1. Each of the plurality of nano-antenna lines NAL may include a plurality of nano-antennas NA connected to each other in a second direction, for example, an x direction, as shown in FIG. 1. The first direction and the second direction are orthogonal to each other in FIGS. 1 through 3 but are not limited thereto. The first direction and the second direction may be any directions that are not parallel to each other.

Metal materials having a high conductivity in which surface plasmon excitation may occur may be employed as the conductive material forming the nano-antennas NA. For example, at least one selected from Cu, Al, Ni, Fe, Co, Zn, Ti, ruthenium (Ru), rhodium (Rh), palladium (Pd), platinum (Pt), silver (Ag), osmium (Os), iridium (Jr), and gold (Au)

may be employed, and an alloy including one of these metals may be employed. A secondary material having good conductivity such as graphene or a conductive oxide may also be used.

The permittivity variation layer 130 may be formed of a material having an optical characteristic that varies according to the external signal. The external signal may be an electrical signal. The permittivity variation layer 130 may be formed of, for example, a transparent conductive oxide (TCO) such as ITO (indium tin oxide), IZO (indium zinc oxide), AZO (aluminum zinc oxide), or GZO (gallium zinc oxide), or some combination thereof. A transition metal nitride such as TiN, ZrN, HfN, and TaN may be used. In addition, an electro-optic material having an effective permittivity that varies if an electric signal is applied, e.g., $LiNbO_3$, $LiTaO_3$, KTN (potassium tantalite niobate), and PZT (lead zirconate titanate) may be used. Various polymer materials having electro-optic characteristics may be used. Any heavily doped semiconductor with doping $10^{13}/cm^3 \sim 10^{15}/cm^3$ may also be used for permittivity variation layer at infrared wavelengths. Si, InGaAs, InAs, InSb, Ge, InGaSb, GaSb are some examples.

The external signal is not be limited to an electrical signal. A material having a permittivity that varies due to an occurrence of a phase transition at a predetermined temperature or higher if heat is applied, for example, $VO_2$, $VO_2O_3$, EuO, MnO, CoO, $CoO_2$, $LiCoO_2$, or $Ca_2RuO_4$ may be employed as the permittivity variation layer 130.

The metal layer 110 may apply a voltage between the metal layer 110 and the plasmonic nano-antenna layer 170 and function as a mirror layer which reflects light. A material of the metal layer 110 may include at least one selected from a variety of metal materials that may perform such a function, for example, Cu, Al, Ni, Fe, Co, Zn, Ti, ruthenium (Ru), rhodium (Rh), palladium (Pd), platinum (Pt), silver (Ag), osmium (Os), iridium (Ir), and gold (Au).

The voltage applying means 110 may be configured to independently apply voltages between the metal layer 110 and each of the plurality of nano-antenna lines NAL.

Referring to FIG. 3, the permittivity variation layer 130 may include an active area 135 having a carrier concentration that varies according to whether a voltage is applied between the metal layer 110 and the plasmonic nano-antenna layer 170. The active area 135 may be formed in an area of the permittivity variation layer 130 adjacent to the dielectric material layer 150 and have the carrier concentration that varies according to the applied voltage. A type or degree of light modulation of light incident onto the optical modulation device 100 is changed based on the carrier concentration in the active area 135. In this regard, the active area 135 may be a gate that adjusts and controls a light modulation performance of the nano-antennas NA.

As described above, the nano-antennas NA may strongly collect light of a specific wavelength band according to the dimensions of the shape thereof. The optical modulation device 100 may include the nano-antennas NA and the metal layer 110 that acts as a mirror. Due to the metal layer 110 and the nano-antennas NA, a magnetic resonance mode is formed so that an epsilon near zero (ENZ) characteristic of the active area 135 is formed, and thus reflection and diffraction of light of a specific wavelength band, from among the incident light, may be adjusted. In this regard, according to whether a voltage is applied between the metal layer 110 and the nano-antennas NA, the carrier concentration of the active area 135 may vary, and thus, the reflection and diffraction of the incident light may vary.

The permittivity of the permittivity variation layer 130 may be different for different wavelengths. A relative permittivity $\in_r$ with respect to a permittivity of vacuum, $\in_0$ is defined as a dielectric constant. A real part of the dielectric constant of the permittivity variation layer 130 is equal to 0 in a predetermined wavelength band. A wavelength band in which the real part of the dielectric constant is equal or approximately equal to 0 is referred to as an ENZ wavelength band. A dielectric constant of most materials may be a function of a wavelength and be indicated as a complex number. The dielectric constant of a vacuum is 1 and the real part of the dielectric constant of a dielectric material is a positive number greater than 1, typically. In the case of metal, the real part of the dielectric constant may be a negative number. The dielectric constant of most materials has a value greater than 1 in most wavelength bands, whereas the real part of the dielectric constant may be equal to 0 in a specific wavelength.

When the real part of the dielectric constant is equal or approximately equal to 0, the dielectric material exhibits a peculiar optical property. The optical modulation device 100 of the current embodiment sets an operating wavelength band as an area including the ENZ wavelength area of the permittivity variation layer 130. That is, the resonance wavelength band of the nano-antennas NA and the ENZ wavelength band of the permittivity variation layer 130 may be set to be similar to each other, thereby further increasing a range of the optical modulation performance that may be adjusted according to the applied voltage.

The ENZ wavelength area of the permittivity variation layer 130 varies according to the carrier concentration formed in the active area 135. To utilize the ENZ wavelength band of the permittivity variation layer 130, a voltage applied by the voltage applying means 190 between the metal layer 110 and the plasmonic nano-antenna layer 170 may be in a range including a voltage value in which the resonance wavelength of the plasmonic nano-antenna layer 170 and a wavelength indicating the ENZ property of the permittivity variation layer 130 are identical to each other.

Figure 4:
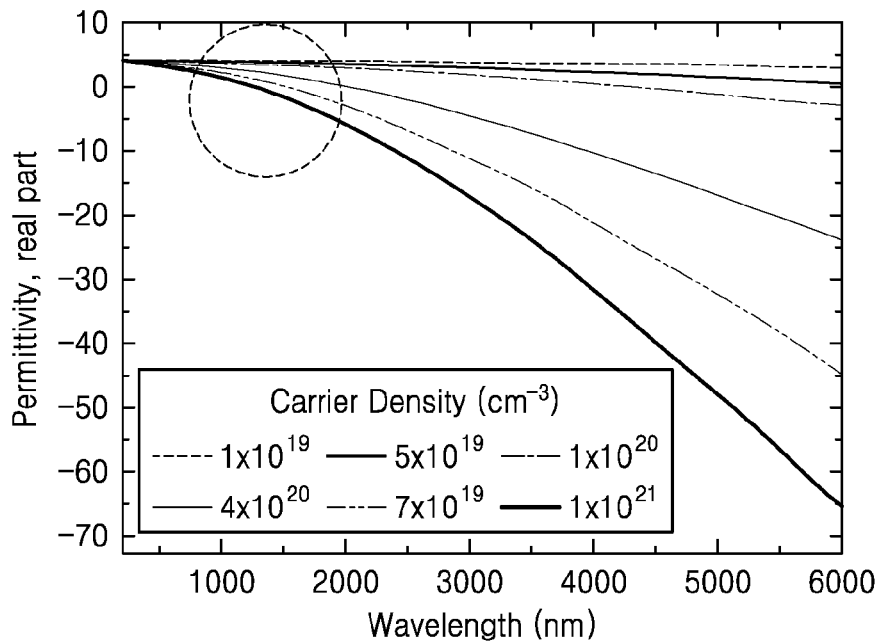
FIG. 4 is a graph of a permittivity variation with respect to a carrier concentration formed in an active area of a permittivity variation layer employed in the optical modulation device of FIG. 1.
Figure 5:
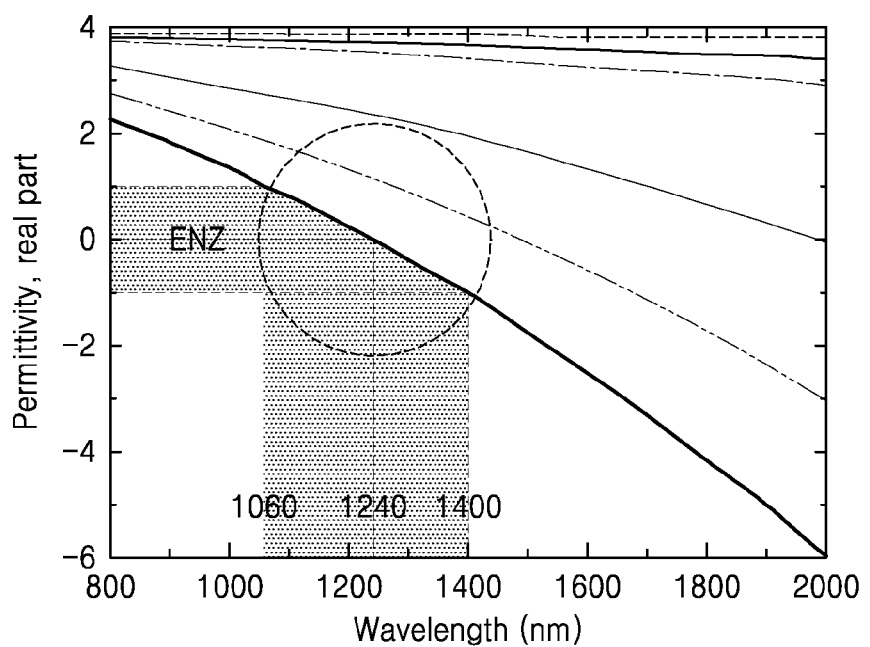
FIG. 5 is an enlarged graph of a highlighted portion of FIG. 4.

FIG. 4 is a graph of a permittivity variation with respect to a carrier concentration formed in the active area 135 of the permittivity variation layer 130 employed in the optical modulation device 100 of FIG. 1. FIG. 5 is an enlarged graph of a circular part of FIG. 4.

The horizontal axes of the graphs denote a wavelength, and the vertical axes denote a real part of a relative permittivity $\in r$, i.e. a dielectric constant.

Referring to the graphs, the curve of the change of the dielectric constant with respect to wavelength varies according to the carrier concentration. For example, when the carrier concentration is $1 \times 10^{21}$ $cm^{-3}$, an ENZ wavelength band in which the real part of the dielectric constant has a value between 1 and −1 is a range between about 1060 nm and about 1400 nm. If the carrier concentration is lower than $1 \times 10^{21}$ $cm^{-3}$, the ENZ wavelength band tends to slightly move to a long wavelength band.

The carrier concentration formed in the active area 135 of the permittivity variation layer 130 may be determined according to an applied voltage, and thus in consideration of the graphs and a resonance wavelength band of the nano-antennas NA, a range of voltage that is to be applied to the optical modulation device 100 may be set in accordance with a desired optical modulation range.

Figure 6:
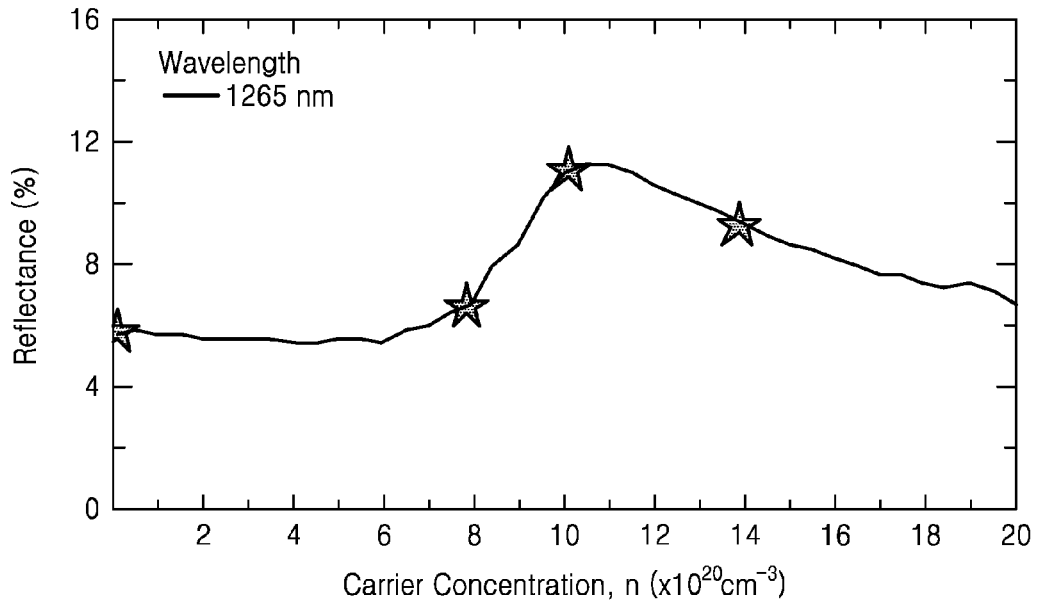
FIG. 6 is a graph of a reflectance with respect to a carrier concentration formed in an active area of a permittivity variation layer employed in the optical modulation device of FIG. 1.
Figure 7:
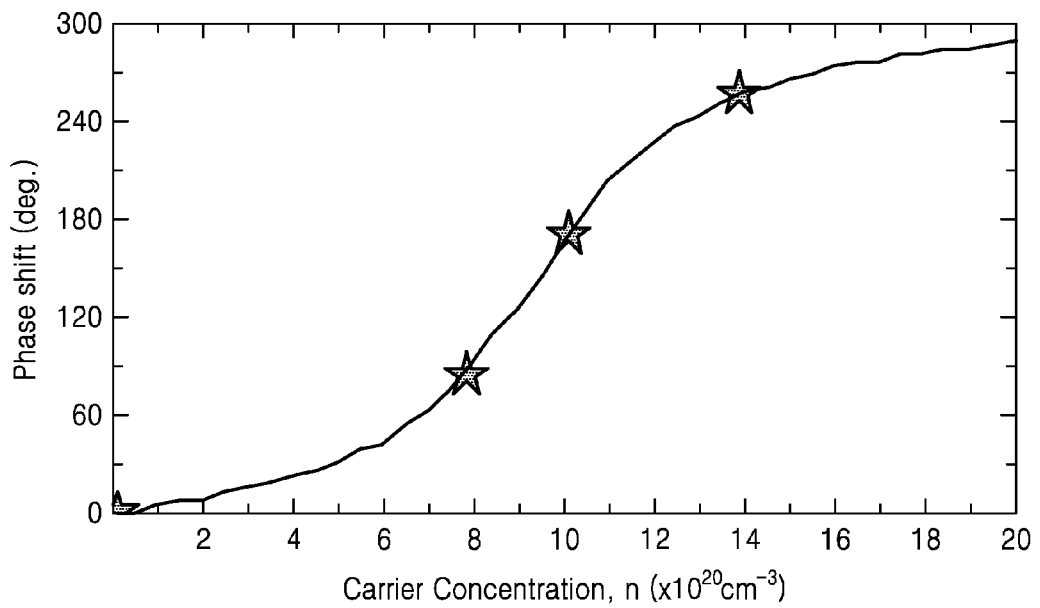
FIG. 7 is a graph of a phase shift with respect to a carrier concentration formed in an active area of a permittivity variation layer employed in the optical modulation device of FIG. 1.

FIG. 6 is a graph of reflectance with respect to a carrier concentration formed in the active area 135 of the permittivity variation layer 130 employed in the optical modulation device 100 of FIG. 1. FIG. 7 is a graph of a phase shift with respect to a carrier concentration formed in the active area 135 of the permittivity variation layer 130 employed in the optical modulation device 100 of FIG. 1.

According to FIG. 6, the optical modulation device 100 is capable of a 4-level phase shift with respect to light of a wavelength of 1265 nm. That is, when light of a wavelength of 1264 nm is incident onto the optical modulation device 100, a phase shift of 0, 90°, 180°, and 270° may occur by changing the carrier concentration, i.e. changing voltage applied between the metal layer 110 and the nano-antennas NA.

Values of voltages applied between the metal layer 110 and the plurality of nano-antennas NA may have a predetermined regularity, and thus the optical modulation device 100 may function as a phase grating.

The optical modulation device 100 may be utilized as a dynamic phase grating according to an exemplary embodiment described below with reference to FIGS. 8 through 15 below.

Figure 8:
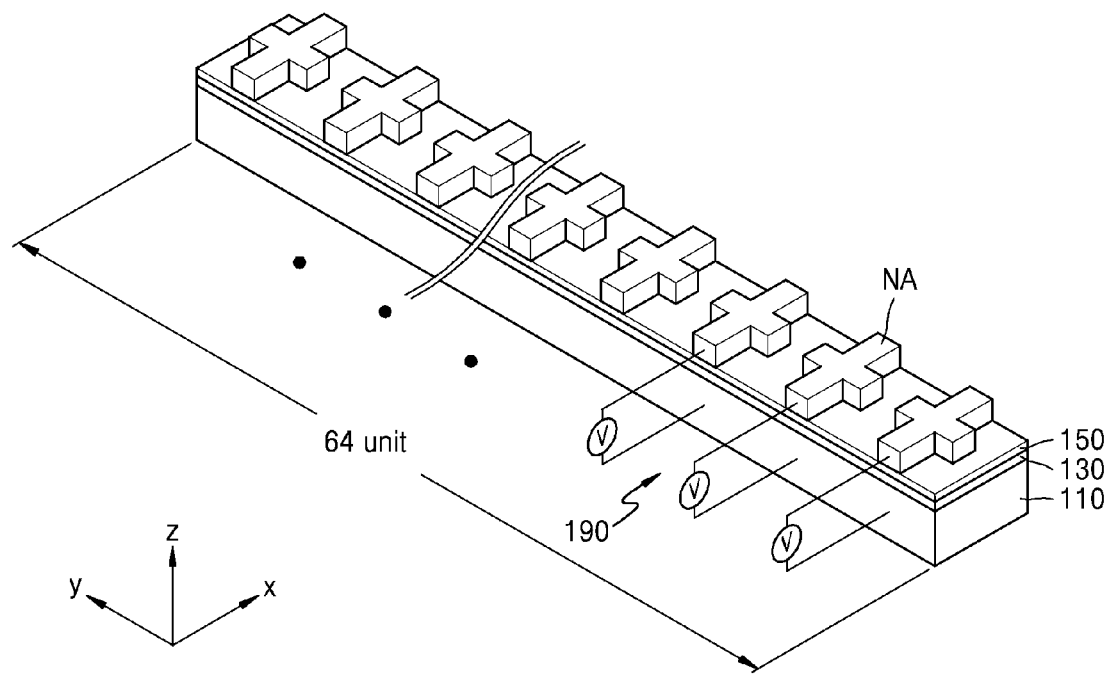
FIG. 8 is a perspective view of a sample structure for a computer simulation in which an optical modulation device is utilized as a dynamic phase grating, according to another exemplary embodiment.
Figure 9:
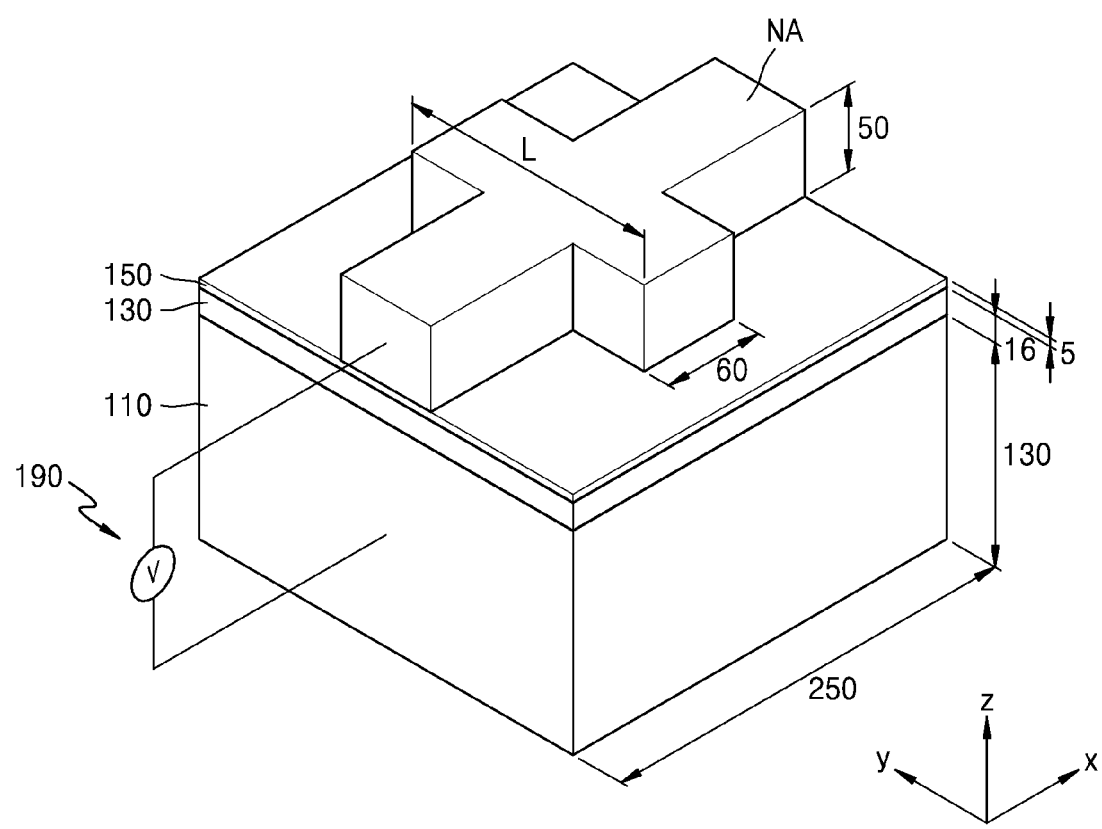
FIG. 9 is a perspective view of detailed values of a unit block of the sample structure of FIG. 8.

FIG. 8 is a perspective view of a sample structure for a computer simulation in which the optical modulation device 100 is utilized as dynamic phase grating, according to an exemplary embodiment. FIG. 9 is a perspective view of detailed dimensions of a unit block of the sample structure of FIG. 8.

Referring to FIG. 8, the sample structure used for the computer simulation may include 64 unit blocks arranged in a y direction. Dimensions of the unit blocks may be the same as shown in FIG. 9 and have a unit of nm. A boundary condition defining that the unit blocks are repeatedly continuous in an x direction may be applied during the computer simulation. L is equal to 180 nm, that is, a length capable of modulating light of a wavelength of 1250 nm. The operating wavelength of the device may be changed by adjusting L. In the computer simulation, it is given that the metal layer 110 and the nano-antennas NA are made of Au, the permittivity variation layer 130 is made of ITO, and the permittivity dielectric material layer 150 is made of $Al_2O_3$.

Figure 10:
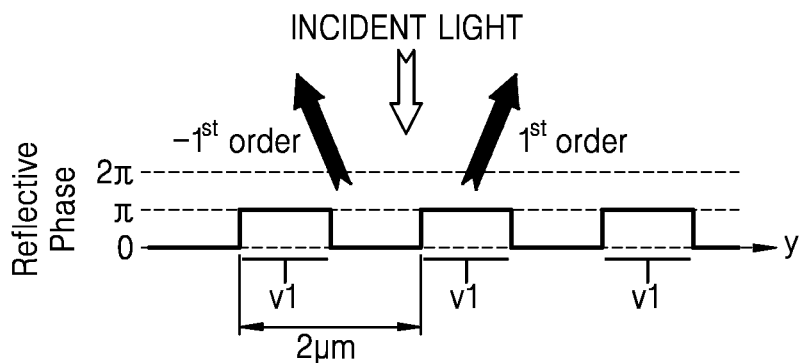
FIG. 10 is a graph of an example of a shape of a voltage applied to the sample structure of FIG. 8 and a phase shift of incident light with respect to the voltage shape and a direction of a $1^{st}$ order diffraction light.

FIG. 10 is a graph of an example of a pattern of a voltage applied to the sample structure of FIG. 8 and a phase shift of incident light with respect to the voltage pattern and a direction of $1^{st}$ order diffraction light.

The voltage V1 shown in FIG. 10 is applied between the metal layer 110 and the nano-antennas NA at a regular period Λ of 2 μm in the sample structure of FIG. 8. That is, the voltage V1 may be applied between the metal layer 110 and each of the nano-antennas NA in four unit blocks in a y direction, and no voltage may be applied between the metal layer 110 and each of the nano-antennas NA in next four unit blocks. Voltages may be applied to 64 unit blocks with this regular period. The voltage V1 may be determined so that the phase shift is π, i.e., 180°.

Since the voltage is regularly applied, an area having the phase shift of 180° and an area having no phase shift are repeated at the same period as the voltage applying period Λ of 2 μm along the surface of the optical modulation device 100. If light is incident onto such a phase grating, according to the computer simulation results, $1^{st}$ and $-1^{st}$ order diffraction light corresponding to a shape in which a phase shift from 0° to 180° at the period of 2 μm may occur.

Figure 11:
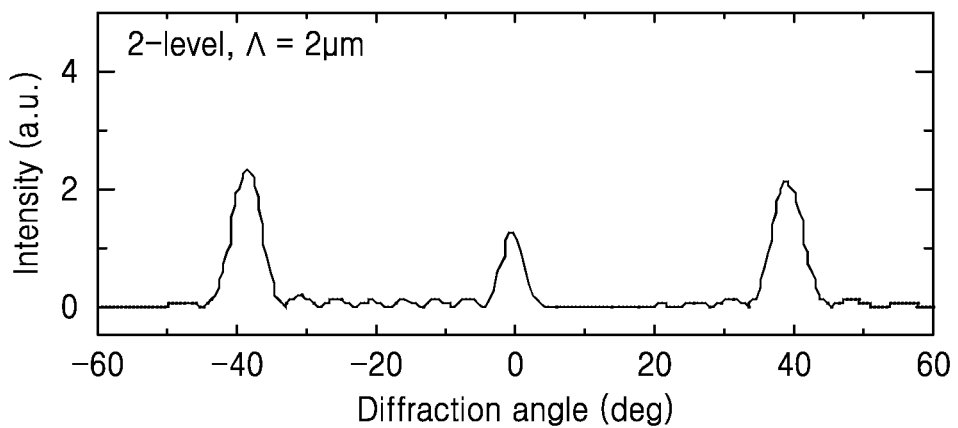
FIG. 11 is a graph of a light intensity with respect to a diffraction angle when a voltage pattern shown in FIG. 10 is applied to the sample structure of FIG. 8.

FIG. 11 is a graph of light intensity with respect to a diffraction angle when a voltage pattern as shown in FIG. 10 is applied to the sample structure of FIG. 8.

Referring to FIG. 11, an intensity peak appears at the diffraction angles 40° and −40°, due to the symmetry of the phase grating. That is, as is shown in the graph of FIG. 10, $1^{st}$ order diffraction light and $-1^{st}$ order diffraction light may be emitted to a direction of incident light.

Figure 12:
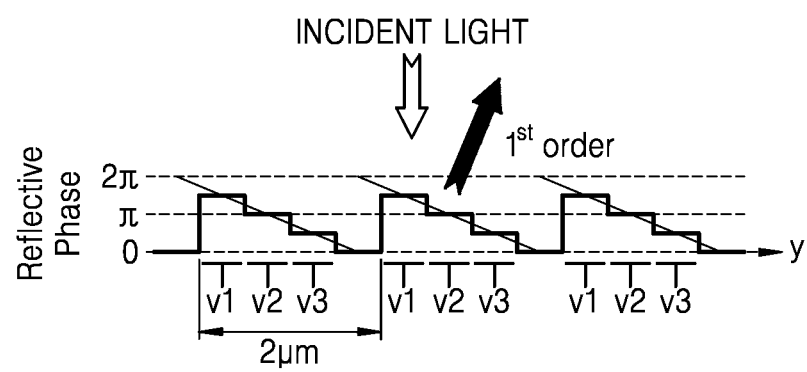
FIG. 12 is a graph of other examples of shapes of voltages applied to the sample structure of FIG. 8 and a phase shift of incident light with respect to the voltage forms and a direction of a 1st order diffraction light.

FIG. 12 is a graph of another example of shapes of voltages applied to the sample structure of FIG. 8 and a resultant phase shift of incident light with respect to the voltage shapes and a direction of $1^{st}$ order diffraction light.

Referring to the graph of FIG. 12, the voltages V1, V2, and V3 may be applied at a regular period so that a phase grating having no symmetry may be formed.

The voltage pattern of V1, V2, V3 of three values that may cause phase shifts of 270°, 180°, and 90° and no voltage application may be applied between the metal layer 110 and the nano-antennas NA at the period Λ of 2 μm. That is, the voltage V1 may be applied between each of the nano-antennas NA and the metal layer 110 in two unit blocks in a y direction, the voltage V2 may be applied between each of the nano-antennas NA and the metal layer 110 in next two unit blocks, the voltage V3 may be applied between each of the nano-antennas NA and the metal layer 110 in next two unit blocks, and no voltage may be applied between each of the nano-antennas NA and the metal layer 110 in next two unit blocks. Such a regular period may be repeatedly applied to 64 unit blocks.

Since voltages are applied at a regular period, an area having the phase shift of 270°, an area having the phase shift of 180°, an area having the phase shift of 90°, and an area having no phase shift are repeated at the same period as the voltage applying period Λ of 2 μm along the surface of the optical modulation device 100. If light is incident onto such phase grating, as shown, it is determined that $1^{st}$ order diffraction light corresponding to a shape in which a phase gradually shifts from 270° to 0° at the period of 2 μm may [S1].

Figure 13:
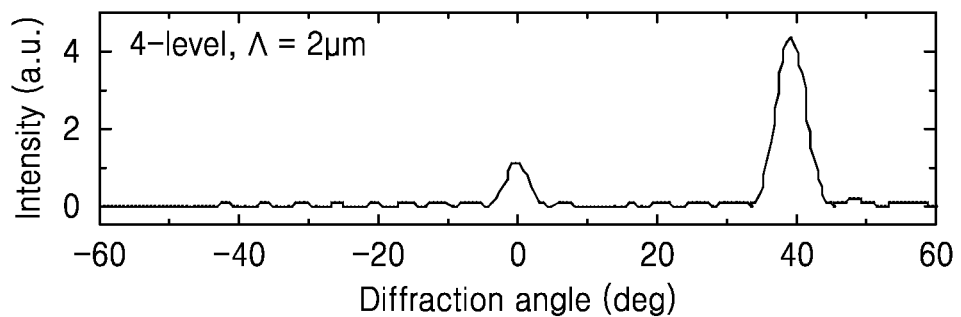
FIG. 13 is a graph of a light intensity with respect to a diffraction angle when a voltage pattern shown in FIG. 12 is applied to the sample structure of FIG. 8.

FIG. 13 is a graph of light intensity with respect to a diffraction angle when a voltage pattern as shown in FIG. 12 is applied to the sample structure of FIG. 8.

Referring to FIG. 13, when the diffraction angle is 40°, an intensity peak appears. As compared with the graph of FIG. 11, the intensity peak appears at the diffraction angle of 40° and does not appear at a diffraction angle of −40°. The peak value is about 2 times greater than that of FIG. 11. Such a difference is due to the phase gating of FIG. 12 having no symmetry, as compared to the symmetry of the phrase grating of FIG. 10.

Figure 14:
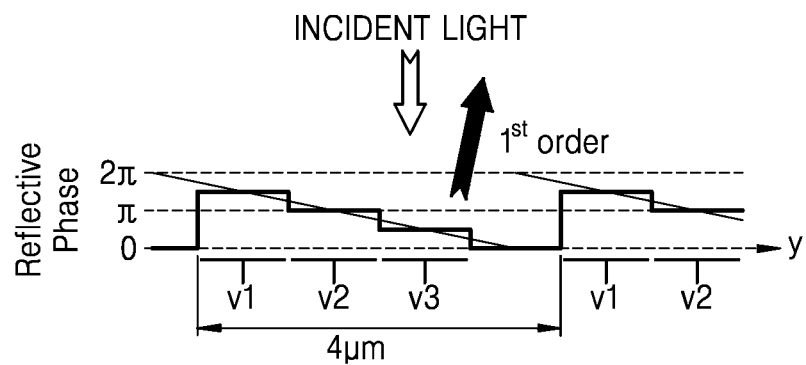
FIG. 14 is a graph of other examples of shapes of voltages applied to the sample structure of FIG. 8 and a phase shift of incident light with respect to the voltage shapes and a direction of a 1st order diffraction light.

FIG. 14 is a graph of another example of shapes of the voltage applied to the sample structure of FIG. 8 and a phase shift of incident light with respect to the voltage shapes and a direction of $1^{st}$ order diffraction light.

The voltage applying pattern of FIG. 14 has a shape in which the period Λ increase to 4 μm, as compared to that of FIG. 12. The voltage pattern of V1, V2, V3 of three values that may cause phase shifts of 270°, 180°, 90° and no voltage application may be applied between the metal layer 110 and the nano-antennas NA at the period Λ of 4 μm. That is, the voltage V1 may be applied between each of the nano-antennas NA and the metal layer 110 in four unit blocks in a y direction, the voltage V2 may be applied between each of the nano-antennas NA and the metal layer 110 in next four unit blocks, the voltage V3 may be applied between each of the nano-antennas NA and the metal layer 110 in next four unit blocks, and no voltage may be applied between each of the nano-antennas NA and the metal layer 110 in next four unit blocks. Such a regular period may be repeatedly applied to 64 unit blocks.

Since the voltages are regularly applied, an area having the phase shift of 270°, an area having the phase shift of 180°, an area having the phase shift of 90°, and an area having no phase shift are repeated at the same period as the voltage applying period Λ of 4 μm along the surface of the optical modulation device 100. If light is incident to such a phase grating, as shown, it is determined that a $1^{st}$ order diffraction light corresponding to a shape in which a phase gradually shifts from 270° to 0° at the period of 4 μm may occur.

Figure 15:
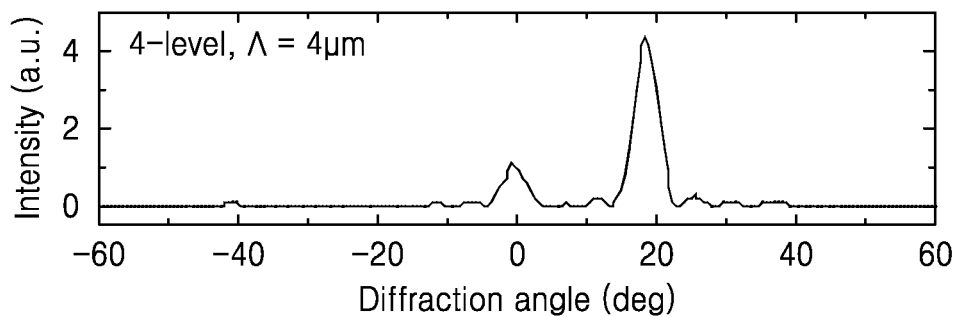
FIG. 15 is a graph of a light intensity with respect to a diffraction angle when a voltage pattern shown in FIG. 14 is applied to the sample structure of FIG. 8.

FIG. 15 is a graph of light intensity with respect to a diffraction angle when the voltage pattern shown in FIG. 14 is applied to the sample structure of FIG. 8.

As described with reference to FIGS. 8 through 15, the optical modulation device 100 may be used as a phase grating according to the shapes of several applied voltage. According to results above, it may be seen that a phase shift control of 2 π may be possible with respect to light of a near IR wavelength by using ITO to form the permittivity variation layer 130. Thus, light of a different wavelength band may be controlled by utilizing a different material for of permittivity variation layer 130 and/or using nano-antennas NA with shapes having different dimensions.

The applied voltage patterns shown herein are examples. A regular period of the voltage pattern applied may be varied, thereby achieving various light modulation results. A phase shift may have various levels including 2 or 4. This may be used to perform light modulation functions such as beam shaping or beam steering.

Figure 16:
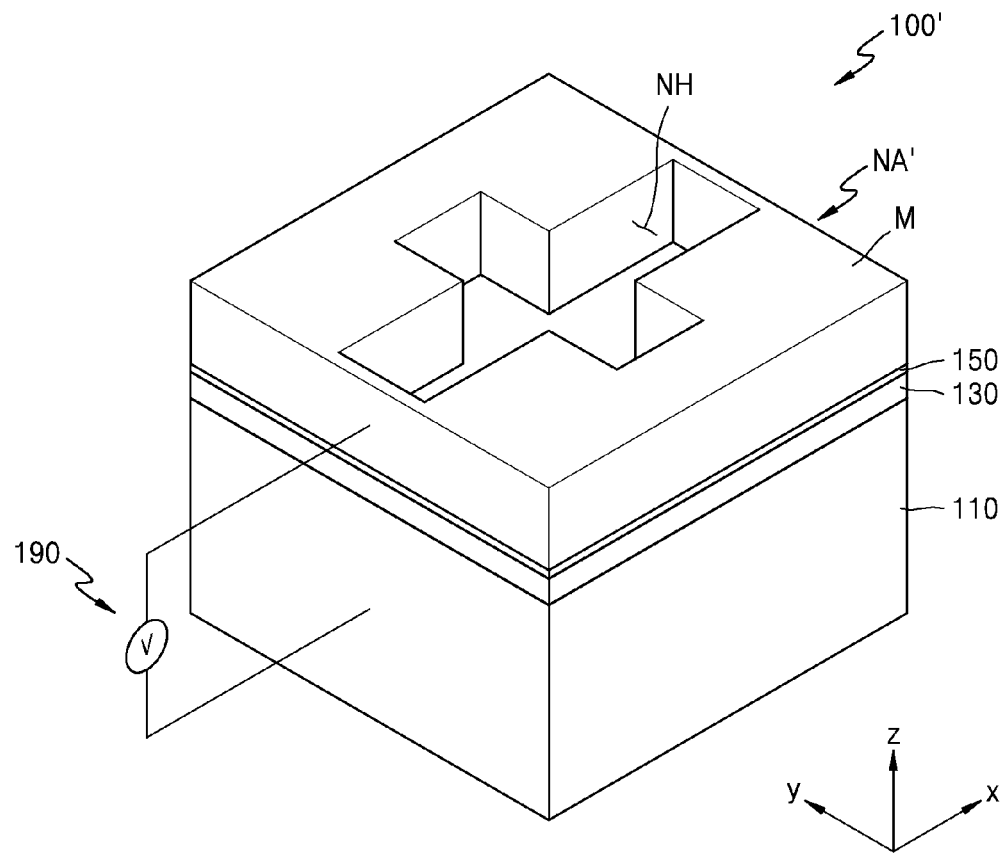
FIG. 16 is a perspective view of a unit block of an optical modulation device, according to another exemplary embodiment.

FIG. 16 is a perspective view of a unit block of an optical modulation device 100', according to another exemplary embodiment.

The optical modulation device 100' may include the metal layer 110, the permittivity variation layer 130, and a nano-antenna NA'. The nano-antenna NA' may have a shape including a nano pattern engraved in a metal material M, unlike the embossed shape of the nano-anntena NA of FIG. 2. That is, the nano-antenna NA' may have a shape that is the inverse of the shape of the nano-anntena NA of FIG. 2. A substantially cross-shaped through hole NH may be engraved in the metal material M.

Although the cross-sectional shapes of the nano-antennas NA and NA' are illustrated as being substantially cross-shaped, this is merely exemplary. The nano-antennas NA and NA' may have any of various shapes.

FIGS. 17A through 17D show exemplary shapes of nano-antennas that may be used in a unit block of an optical modulation device, according to exemplary embodiments.

Figure 17A:
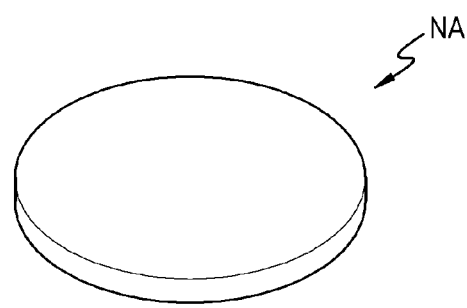
FIGS. 17A through 17D show exemplary shapes of nano-antennas that may be employed in a unit block of an optical modulation device, according to an exemplary embodiment.

Referring to FIG. 17A, a cross-sectional shape of the nano-antenna NA may be circular. A nano-antenna NA with such a shape may be used in the optical modulation device 100 of FIG. 1. A plurality of circular nano-antennas NA may be arranged to be connected to each other in one direction to form a nano-antenna line NAL.

Figure 17B:
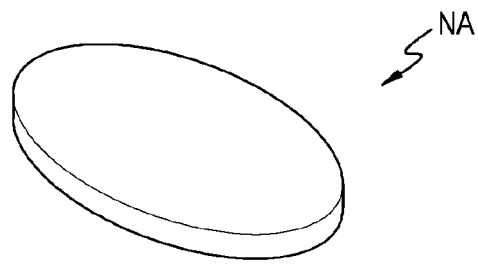

Referring to FIG. 17B, a cross-sectional shape of the nano-antenna NA may be oval. A nano-antenna NA with such a shape may be used in the optical modulation device 100 of FIG. 1. A plurality of oval nano-antennas NA may be arranged to be connected to each other in one direction, for example, along a major axis, to form a nano-antenna line NAL. The plurality of oval nano-antennas NA may be arranged to be connected to each other in a different direction from the major axis, for example, along a minor axis or in another direction, to form the nano-antenna line NAL.

Figure 17C:
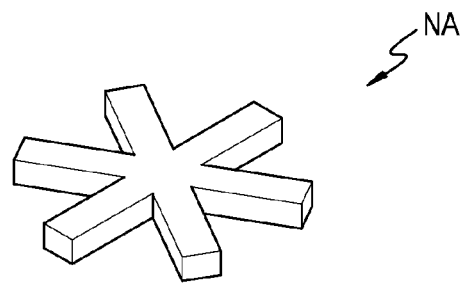

Referring to FIG. 17C, the nano-antenna NA may have a star (*) shape in which three nano rods intersect. A plurality of star shape nano-antennas NA may be connected to each other in one direction, for example, a length direction of one of the three nano rods, to form the nano-antenna line NAL of the optical modulation device 100 of FIG. 1.

Figure 17D:
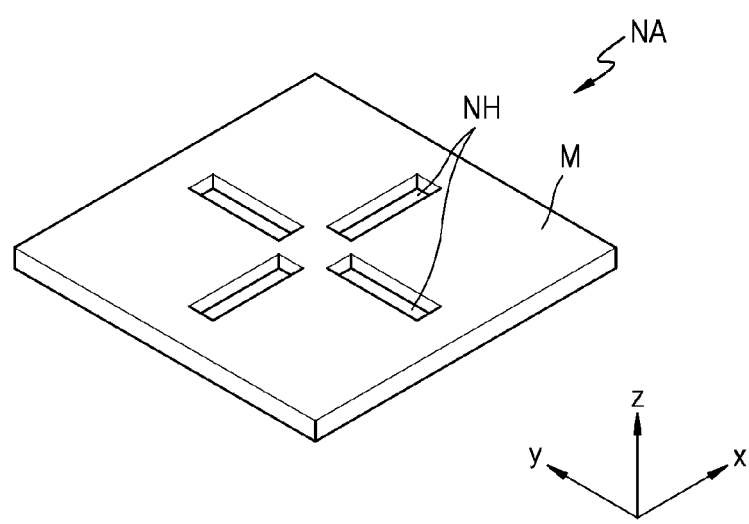

The nano-antenna NA of FIG. 17D may have a shape in which a plurality of nano pattern through holes NH are formed in the metal material M. A plurality of such shape of nano-antennas NA may be connected to each other, for example, in an x direction, to form the nano-antenna line NAL of FIG. 1.

The shapes of FIGS. 17A through 17D are exemplary. In addition, the nano-antenna NA may have any of various shapes, for example, polygonal shapes, nano rods, etc.

Figure 18:
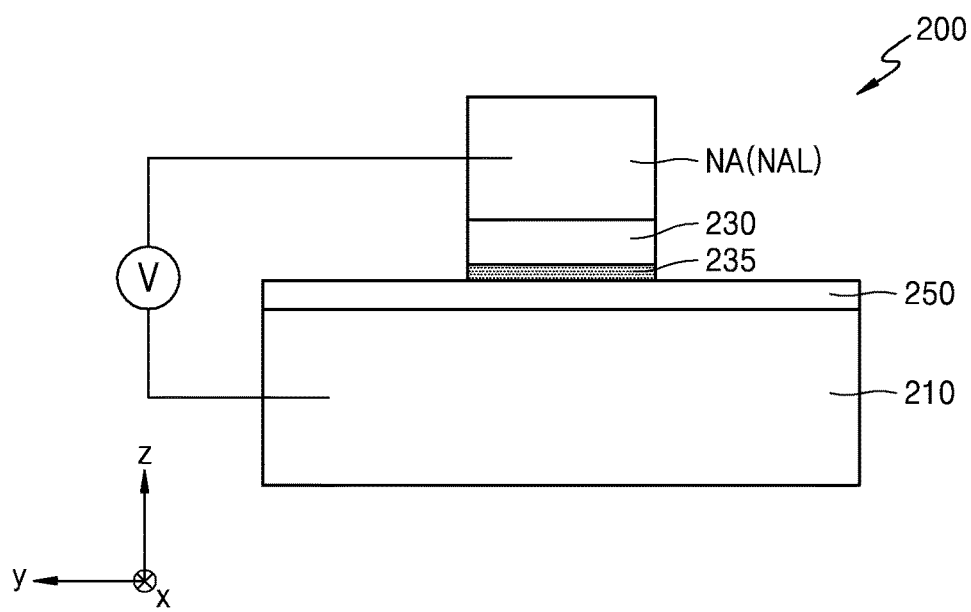
FIG. 18 is a cross-sectional view of a unit block of an optical modulation device, according to another exemplary embodiment.

FIG. 18 is a cross-sectional view of a unit block of an optical modulation device 200, according to another exemplary embodiment.

The optical modulation device 200 may include a metal layer 210, a dielectric material layer 250, a permittivity variation layer 230, and a nano-antenna NA.

The optical modulation device 200 of the present embodiment is different from the optical modulation device 100 of FIG. 2 in the arrangement of the dielectric material layer 250 and the permittivity variation layer 230. That is, the dielectric material layer 250 may be provided on the metal layer 210, the permittivity variation layer 230 may be provided on the dielectric material layer 250, and the nano-antennal NA may be provided on the permittivity variation layer 230. The plurality of nano-antennas NA may be arranged to be connected to each other in an x direction to form the nano-antenna line NAL. The permittivity variation layer 230 may be patterned in the same shape as the nano-antenna NA.

If voltage is applied between the metal layer 210 and the nano-antennal NA, an active area 235 may be formed in the permittivity variation layer 230. The active area 235 may be formed in the region of the permittivity variation layer 230 adjacent to the dielectric material layer 250, may have a carrier concentration that varies according to a change in the applied voltage, and may thereby function as a gate that adjusts and controls optical modulation performance.

Figure 19:
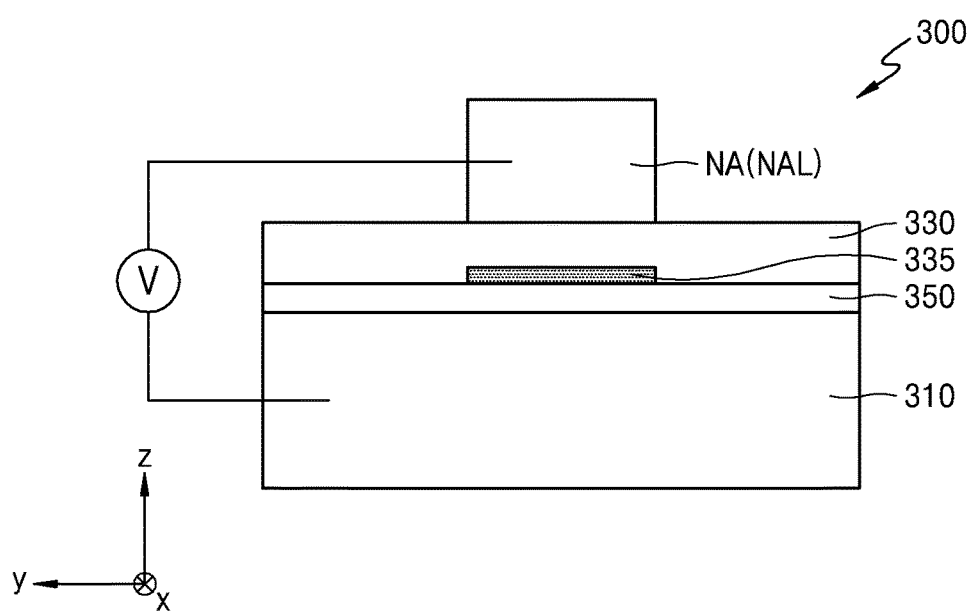
FIG. 19 is a cross-sectional view of a unit block of an optical modulation device, according to another exemplary embodiment.

FIG. 19 is a cross-sectional view of a unit block of an optical modulation device 300, according to another exemplary embodiment.

The optical modulation device 300 may include a metal layer 310, a dielectric material layer 350, a permittivity variation layer 330, and a nano-antenna NA.

The optical modulation device 300 of the present exemplary embodiment is different from the optical modulation device 200 of FIG. 18 in that the permittivity variation layer 330 is not patterned in the same shape as the nano-antenna NA. That is, the dielectric material layer 350 and the permittivity variation layer 330 may be formed on an entire surface the metal layer 310, and the nano-antenna NA may be formed in a predetermined pattern on the permittivity variation layer 330. The plurality of nano-antennas NA may be arranged to be connected to each other in an x direction to form the nano-antenna line NAL.

If a voltage is applied between the metal layer 310 and the nano-antennal NA, an active area 335 may be formed in the permittivity variation layer 330. The active area 335 may be formed in a region of the permittivity variation layer 330 adjacent to the dielectric material layer 350, may have a carrier concentration that varies according to a change in the applied voltage, and may thereby function as a gate that adjusts and controls optical modulation performance.

In the above-described optical modulation device, a material of a permittivity variation layer, a shape and/or dimensions of a nano-antenna, and a form of the applied voltage may be changed in any of various ways, thereby providing various optical modulation performances in a desired wavelength band. For example, in the structure of FIG. 1, a plurality of nano-antennas may be arranged in a matrix shape to form a plasmonic nano-antenna layer, and voltage applying means may be configured to individually control the voltage between each of the nano-antennas and a metal layer. The nano-antennas included in the plasmonic nano-antenna layers illustrated herein have the same shape, but this is merely exemplary. Nano-antennas within the same plasmonic nano-antenna layer may have different shapes. Alternatively, nano-antennas in the same plasmonic nano-antenna layer may have the same shape, but different dimensions, so that a resonance wavelength band may be differently in each area.

The above-described optical modulation device may include the plasmonic nano-antenna layer and the permittivity variation layer and may modulate incident light in any of various shapes by utilizing, as a gate, an area of the permittivity variation layer in which a carrier concentration varies.

The above-described optical modulation device may be manufactured to have a small size and may enable fast driving. Thus, the optical modulation device may be used in any of various optical apparatuses, thereby improving the performance thereof.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An optical modulation device comprising:
a plasmonic nano-antenna layer;
a metal layer;
a permittivity variation layer disposed between the plasmonic nano-antenna layer and the metal layer, the permittivity variation layer having a permittivity that varies according to a signal applied thereto; and
a dielectric material layer disposed between the plasmonic nano-antenna layer and the metal layer.

2. The optical modulation device of claim 1, further comprising: a signal applying means configured to apply the signal to the permittivity variation layer, thereby causing a change in the permittivity of the permittivity variation layer.

3. The optical modulation device of claim 2, wherein the signal applying means comprises a power source configured to apply a voltage between the plasmonic nano-antenna layer and the metal layer.

4. The optical modulation device of claim 3, wherein the permittivity variation layer comprises an electro-optic material having a permittivity that varies according to an electrical signal applied thereto.

5. The optical modulation device of claim 4, wherein the permittivity variation layer comprises a transparent conductive material.

6. The optical modulation device of claim 4, wherein the permittivity variation layer comprises a transition metal nitride.

7. The optical modulation device of claim 4, wherein the permittivity variation layer comprises an active area having a carrier concentration that varies according to a voltage applied between the plasmonic nano-antenna layer and the metal layer.

8. The optical modulation device of claim 7, wherein the active area of the permittivity variation layer is adjacent to the dielectric material layer.

9. The optical modulation device of claim 7, wherein a real part of a dielectric constant of the permittivity variation layer is equal to 0 in a predetermined wavelength band.

10. The optical modulation device of claim 9, wherein the predetermined wavelength band is different according to the carrier concentration in the active area.

11. The optical modulation device of claim 9, wherein the voltage applied by the power source between the plasmonic nano-antenna layer and the metal layer is in a range including a voltage value at which a resonance wavelength band of the plasmonic nano-antenna layer and the predetermined wavelength band are identical.

12. The optical modulation device of claim 4,
wherein the plasmonic nano-antenna layer comprises a plurality of nano-antenna lines spaced apart from each other in a first direction, and
wherein each of the plurality of nano-antenna lines comprises a plurality of nano-antennas connected to each other in a second direction different from the first direction.

13. The optical modulation device of claim 12, wherein each of the plurality of nano-antennas has a crisscross shape in which a nano rod having a length in the first direction and a nano rod having a length in the second direction cross each other.

14. The optical modulation device of claim 12, wherein each of the plurality of nano-antennas is one of circular, oval, polygonal, X-shaped, and star-shaped.

15. The optical modulation device of claim 12, wherein the power source is configured to independently apply a voltage between each of the plurality of nano-antenna lines and the metal layer.

16. The optical modulation device of claim 15, wherein values of voltages applied between the metal layer and each of the plurality of nano-antenna lines have a predetermined regularity in the first direction.

17. The optical modulation device of claim 1,
wherein the permittivity variation layer is disposed on the metal layer and the dielectric material layer is disposed on the permittivity variation layer.

18. The optical modulation device of claim 1,
wherein the dielectric material layer is disposed on the metal layer and the permittivity variation layer is disposed on the dielectric material layer.

19. The optical modulation device of claim 18, wherein the permittivity variation layer is patterned in a same shape as the plasmonic nano-antenna layer.

20. The optical modulation device of claim 1, wherein the plasmonic nano-antenna layer comprises a metal material and a nano pattern of a plurality of through holes formed in the metal material.

21. An optical apparatus comprising the optical modulation device of claim 1.

22. An optical modulation device comprising:
a plasmonic nano-antenna layer comprising a two-dimensional array of a plurality of nano-antennas;
a metal layer;
a permittivity variation layer disposed between the plasmonic nano-antenna layer and the metal layer, wherein the permittivity variation layer comprises a two-dimensional array of a plurality of active areas, corresponding to the two-dimensional array of the plurality of nanoantennas, each of the plurality of active areas having a carrier concentration that varies according to a voltage applied thereto; and a dielectric material layer disposed between the plasmonic nano-antenna layer and the metal layer.

* * * * *